United States Patent Office.

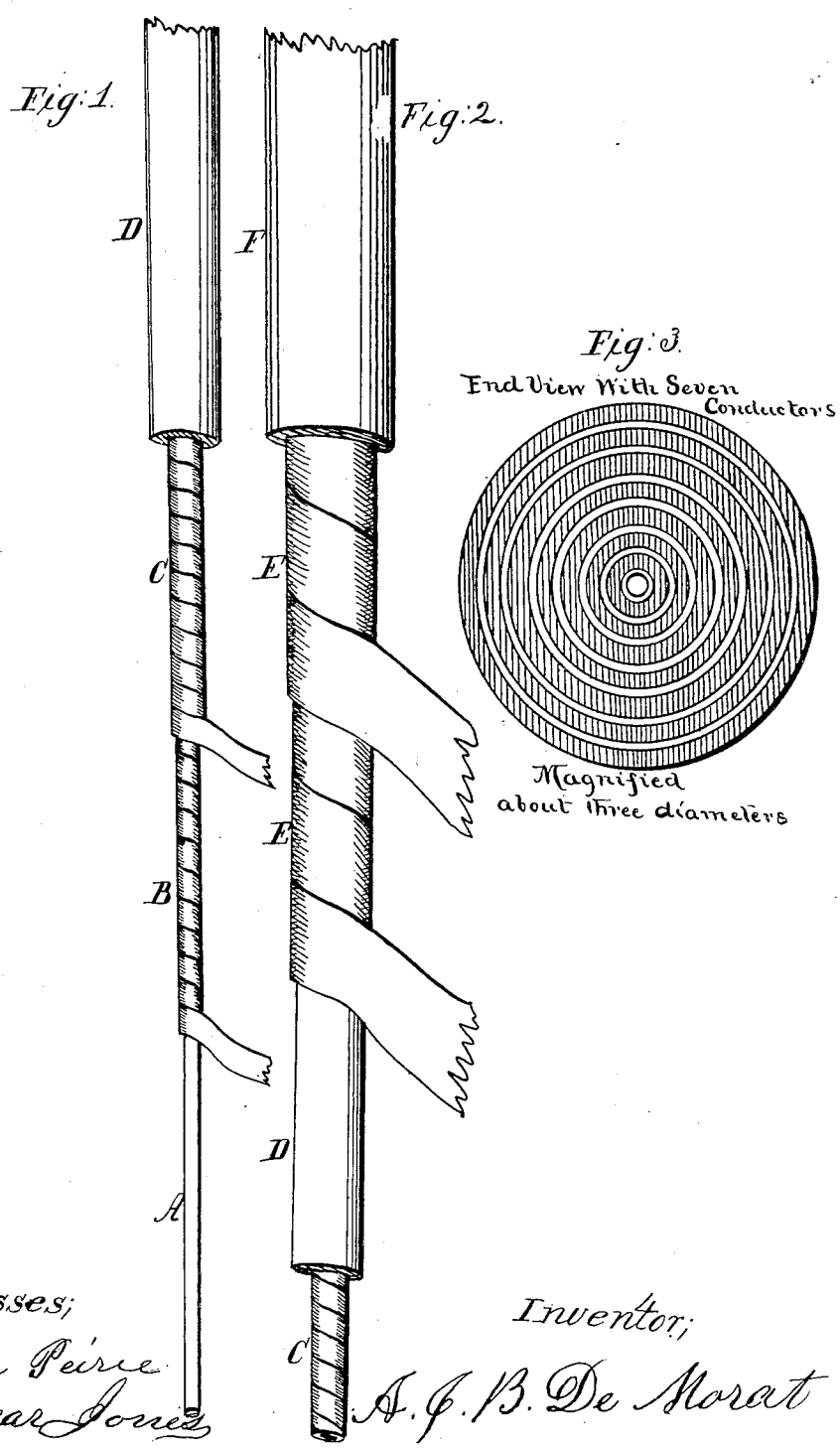

ALEXANDER J. B. DE MORAT, OF PHILADELPHIA, PENNSYLVANIA.

*Letters Patent No. 61,325, dated January 22, 1867.*

IMPROVEMENT IN TELEGRAPHIC CABLES.

The Schedule referred to in these Letters Patent and making part of the same.

TO ALL WHOM IT MAY CONCERN:

Be it known that I, ALEXANDER JOHN BAPTISTE DE MORAT, of Philadelphia, in the county of Philadelphia, State of Pennsylvania, have invented a new and improved Telegraphic Cable; and I do hereby declare that the following is a full and exact description thereof, reference being had to the accompanying drawings, and to the letters of reference marked thereon.

The nature of my invention consists in the construction of a telegraphic cable with one or more perfectly unbroken continuous tubes or cylinders, made by helically wound metallic strips, insulated internally and externally, and so constructed that when strained or stretched, the conductive power of the cylinder remains unimpaired, and always in a direct line and not spiral. By means of cylinders or tubes, the number of conductors in one cable may be increased indefinitely, without many of the objections that now exist in other cables where more than one conductor is made and attempted to be used. To those trying this cable, the advantages are so readily apparent that it is unnecessary to enter into a discussion of them.

To enable others skilled in the art to make and use my invention, I will proceed to describe its construction.

I take one or more steel, iron, or copper, or other metallic wires, as at A, Figure 1, and wind closely around this a strip or band of copper, or other metal, in a spiral manner, as at B, fig. 1, and over the joints of this spiral covering I wind another metallic strip in a similar manner, but carefully breaking the joints of the first, as at C, fig. 1. The whole is then covered with thread, gutta percha, or other insulating material, as at D, fig. 1. If another cylinder is desired, I wind, closely and spirally, two more metallic strips, the second over and breaking the joints of the first, in like manner as the first cylinder, as at E and E, Figure 2, and this again coated with insulating material, as at F, fig. 2; and this process is continued until any desired number of cylinders is attained. Several small cables, like fig. 1 or fig. 2, may be bound firmly together and insulated, and thus form a double or compound cable. The whole cable is then covered with jute or otherwise protected as in other cables.

What I claim as my invention, and desire to secure by Letters Patent, is—

The construction of a telegraphic cable, by means of insulated tubes or continuous cylinder or cylinders, formed of helically wound strips, in such manner as to preserve uninterrupted linear conduction in case of stretching, as herein set forth, or any other substantially the same, and which will produce these intended effects.

ALEXANDER JOHN BAPTISTE DE MORAT.

Witnesses:
I. NEWTON PEIRCE,
A. OSCAR JONES.